Sept. 24, 1968  B. I. SOLOKHIN ET AL  3,402,838
THRUST MECHANISM FOR THE BUCKET OF AN EXCAVATOR
Filed Jan. 7, 1966  2 Sheets-Sheet 1

United States Patent Office 3,402,838
Patented Sept. 24, 1968

3,402,838
THRUST MECHANISM FOR THE BUCKET
OF AN EXCAVATOR
Boris Ivanovich Solokhin, Leningradskoi obl., prospekt im. Lenina 21, kv. 40, and Alexandr Alexandrovich Bakhvalov, Leningradskoi obl., Vokzalnaya ul. 11, kv. 6, both of Kolpino, U.S.S.R., and Vladimir Iosifovich Khazak, Dalnevostochny prospekt 60, kv. 4, Leningrad, U.S.S.R.
Filed Jan. 7, 1966, Ser. No. 519,263
5 Claims. (Cl. 214—135)

ABSTRACT OF THE DISCLOSURE

A thrust mechanism composed of a displaceable cone engaged in a split ring constituted by a plurality of wedges which are inserted in a tapered sleeve and act on a spring contained in the sleeve.

---

The present invention relates to thrust mechanisms of single bucket excavators which impart force to the working unit by means of a flexible tie.

It is known that working equipment and drives of the excavator mechanisms are subject to great dynamic forces when the excavator encounters an immovable obstacle. Evidently, it is undesirable to have such substantial dynamic loads.

At present, to reduce dynamic efforts in single-bucket excavators, the thrust mechanisms are equipped with couplings of various constructions.

However, such thrust mechanisms are characterized by a number of disadvantages. One of these is the instability of the friction efficiency of the coupling, which depends on temperature, atmospheric conditions and so on.

This requires the provision of a considerable margin of safety (with respect to braking force) of the coupling adhesion.

It should be also pointed out as a disadvantage, that after the beginning of slipping, the coupling continues to impart a moment approximately equal to that during working.

Besides, with the slipping of the coupling, self-oscillation may arise in the thrust mechanisms.

All this causes unreliability and short life of these thrust mechanisms because of the coupling itself, and makes it necessary, as practice has shown, to adjust the coupling into the "dead position."

When working in hard rock, the coupling slips very often, almost in every cycle of excavation, which prolongs the duration of the cycle.

The object of the invention is to eliminate the aforementioned disadvantages.

This object is achieved by the reduction of the rigidity of the mechanism imparting force to the working unit, and by the installation of a damping member between the flexible tie member of the mechanism and the working unit. In the given case, the damping member is constructed as a spring combined with a friction element imparting force from the flexible tie to said spring.

The following detailed description of the invention is given with reference to the accompanying drawings, in which.

Figure 1:
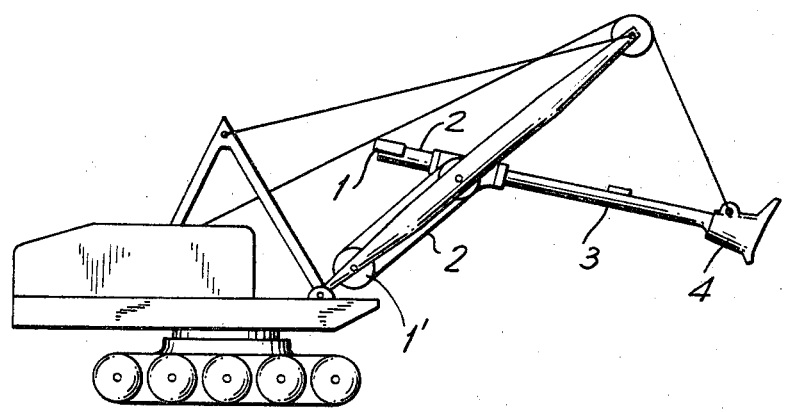
FIG. 1 is a side view of single-bucket excavator having a thrust mechanism in accordance with the invention.
Figure 2:
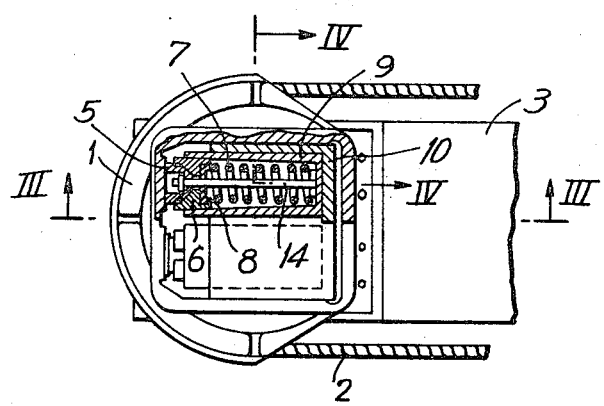
FIG. 2 is a view partly in section of a resilient damping member of the mechanism fixed on the excavator handle.

The thrust mechanism (FIGS. 1, 2 and 3) comprises a thrust drum 1' and a thrust semiblock 1, encircled by a rope 2 imparting force to a handle 3 with a bucket 4, and a resilient damping member consisting of two devices, each comprising a friction element consisting of a pressure cone 5 and a split ring. The split ring is constituted by a plurality of wedges 6. The wedges rest on a spring 7 through a pressure washer 8.

Figure 3:
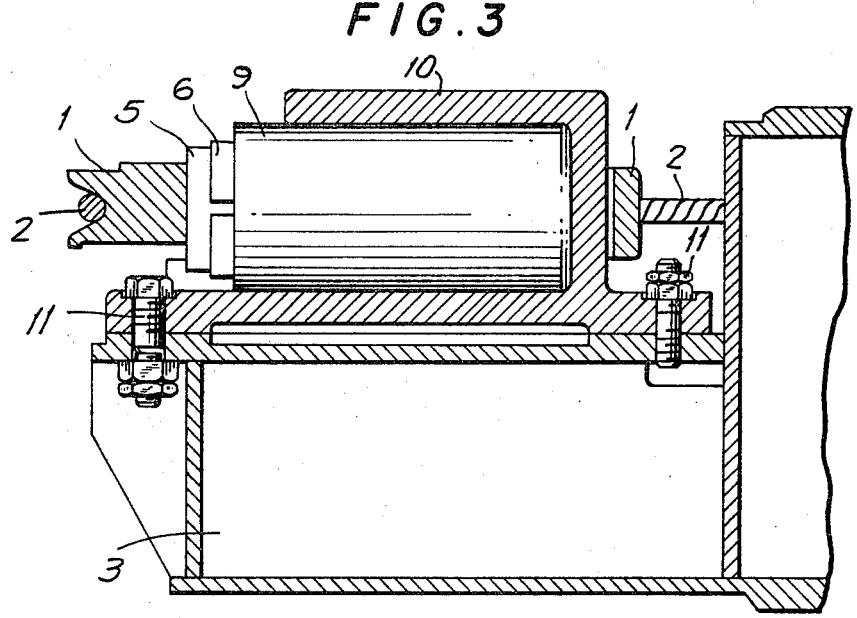
FIG. 3 is a sectional view taken on line III—III of FIG. 2.

All the aforementioned parts of each device of the resilient damping member are located in sleeves 9. Both sleeves are placed in one housing 10 rigidly fixed by means of bolts 11 on the handle 3 (FIG. 3).

Figure 4:
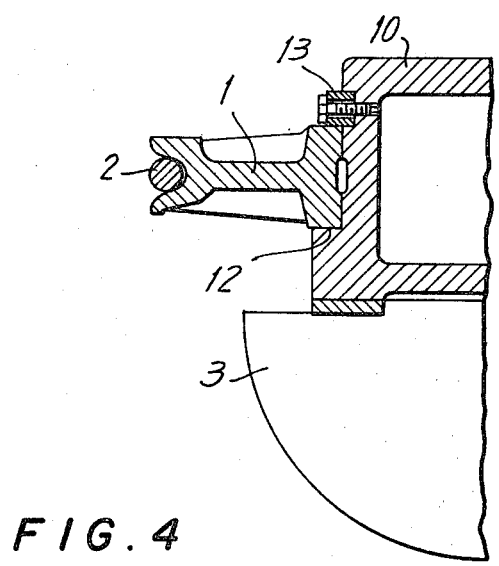
FIG. 4 is a sectional view taken on line IV—IV of FIG. 2.

The semiblock is mounted on the housing 10 in guides 12 (FIG. 4), along which it moves upon releasing the resilient damping member. At the other side, the movement of the semiblock is limited by detachable plates 13 which are also fixed to the housing 10. Each device is provided with a central bolt 14 (FIG. 2) for adjusting the release effort.

When loads in the pressure rope 2 are greater than those for which the resilient damping member is adjusted, the pressure semiblock makes the cones 5 move. The latter, in turn, act on the split ring, whose wedges move together and into the sleeve. The inner surface of the sleeve is also tapered. The load is transmitted via spring 7 and sleeves 9 to the housing 10 rigidly secured on handle 3.

In operation, when force is applied to semiblock 1, the cone 5 is urged against wedges 6, and initially the wedges are displaced within the sleeve 9 against the action of the spring damping member 7 which at first offers relatively little resistance. As the spring is compressed, its resistance increases and the wedges will be spread and urged with increased intensity against the sleeve 9 and thereby wedged therewithin. Due to the presence of the friction element in the damping member, 75–90% of the kinetic energy of the mechanism is converted into irreversible work of friction forces. Upon removing the load, the spring returns the whole system to the initial position.

For effective operation of the resilient damping member it is necessary to insure that it will remain elastic at the maximum possible load.

We claim:

1. A thrust mechanism for a bucket comprising a first member to which thrust is to be applied, said first member supporting said bucket, a flexible member for applying thrust to said first member and means coupling the first member and the flexible member to provide resilient damping and frictional locking engagement, the latter means including a damping device and wedging means, the damping device acting on one of said members, the wedging means acting on the other of the members and on the damping means, such that when thrust is applied to said flexible member for transfer to said first member, the thrust is applied to said damping device via said wedging means.

2. A mechanism as claimed in claim 1 wherein said wedging means comprises a pressure cone subjected to the action of the flexible member, a plurality of split wedges receiving said cone, and a sleeve receiving said wedges, the damping device being in said sleeve and acting on the wedges.

3

3. A mechanism as claimed in claim 2 wherein said means coupling the first member and the flexible member comprises a semiblock slidably mounted on said first member and accommodating said flexible member.

4. A mechanism as claimed in claim 3 wherein said first member includes a housing, said sleeve being mounted in said housing.

5. A mechanism as claimed in claim 4 wherein said damping device is a spring.

4

References Cited

UNITED STATES PATENTS 1,937,432  11/1933  Messick _____ 214—135

FOREIGN PATENTS 463,796  4/1937  Great Britain.

HUGO O. SCHULZ, *Primary Examiner.*